June 8, 1948.	D. R. CROSBY	2,443,097
RADIO FREQUENCY WATTMETER
Filed Nov. 16, 1944
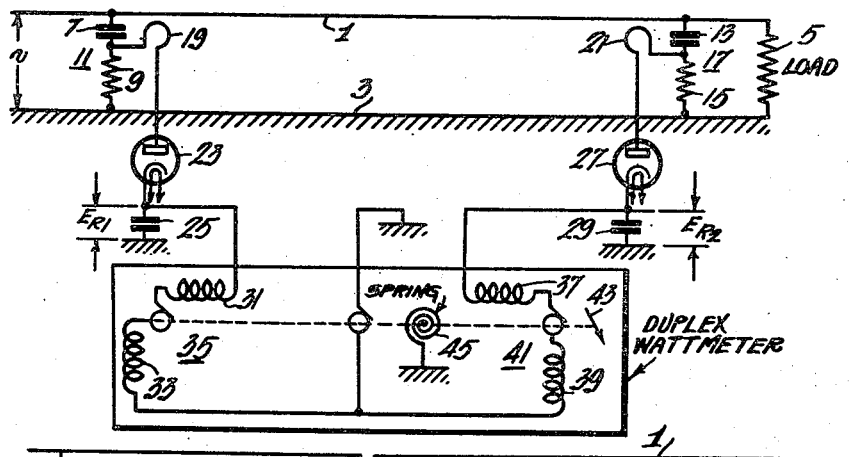
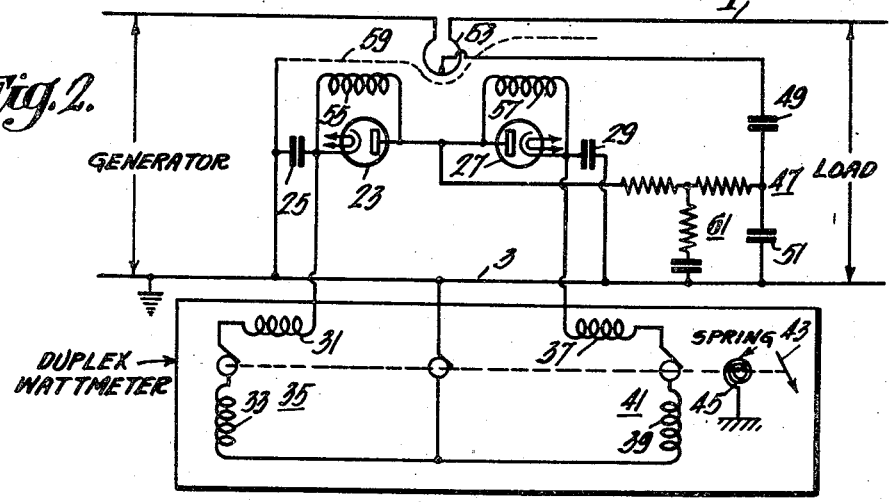
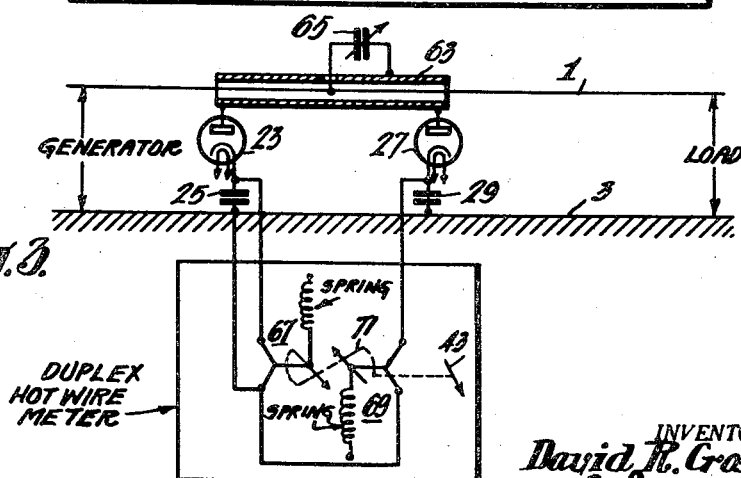
INVENTOR.
David R. Crosby
BY
ATTORNEY Patented June 8, 1948

2,443,097

UNITED STATES PATENT OFFICE 2,443,097

RADIO-FREQUENCY WATTMETER

David R. Crosby, Haddonfield, N. J., assignor to Radio Corporation of America, a corporation of Delaware Application November 16, 1944, Serial No. 563,721

10 Claims. (Cl. 171—95)

This invention relates generally to the measurement of electrical energy and more particularly to an improved wattmeter for measuring power in a transmission line or circuit at high or low frequencies.

Heretofore, various types of wattmeters, particularly for measurements at radio frequencies, have been utilized which provide power measurements responsive to the current and voltage on transmission lines of various types. The most accurate of the devices employed heretofore are the type utilizing a pair of vacuum thermocouples to measure the difference of the squares of currents derived from the transmission line by inductive and capacitive coupling thereto. In such devices, the difference of the currents generated by the thermal junctions is indicated by a conventional microammeter. A typical example of such radio frequency wattmeters is described in the Proceedings of the Institute of Radio Engineers for August 1943, at pages 403 to 310, inclusive. An improvement upon the method and circuit described in said publication is disclosed and claimed in the copending application of George H. Brown and Rudolph A. Bierwirth, Serial No. 516,422, filed December 31, 1943, now Patent No. 2,416,977, dated March 4, 1947. The copending application discloses a phase compensating circuit providing improved accuracy in power measurement over a relatively wide frequency range.

Another well known system for measuring radio frequency power by means of a pair of thermocouples is the circuit described and claimed in U. S. Patent 2,344,641 granted to Charles A. Rosencrans on March 31, 1944, in which a novel unity coupling device comprising a cylindrical conductor coupled to one of the transmission line conductors provides the desired inductive and capacitive coupling between the line and the two thermocouples.

While the dual thermocouple measuring system provides extremely accurate measurements of radio frequency power of all frequencies within the frequency range of the coupling system, the thermocouples themselves are both relatively expensive and extremely subject to damage due to current overloads. Since relatively high currents may be applied to either thermocouple even at low power due to variations in phase between the line voltage and current, practical operation of circuits employing such devices requires extremely careful and skilled manipulation.

Other types of power measurement employed heretofore such, for example, as direct measurement of line current combined with a separate measurement of line impedance, or the use of balanced modulators or vacuum type voltmeters for indicating the difference of the squares of the currents responsive to inductive and capacitive coupling to the transmission line do not provide the required accuracy of power measurement under all operating conditions.

The instant invention comprises an improvement upon systems of the type described in the copending application or patent wherein a pair of diode thermionic tubes connected as peak detectors or average detectors, are connected to a pair of conventional electromagnetic wattmeters which are arranged to deflect an indicator as a function of the difference of the powers applied to each wattmeter movement. Diode rectifiers will operate as average voltage detectors providing their load circuits have a time constant which is sufficiently low. Average value detectors have the advantage that the presence of relatively low amplitude harmonics or extraneous components will produce a smaller power error than is the case with peak rectification. An alternative embodiment of the invention employs a pair of thermionic diode peak detectors which actuate a corresponding pair of thermally responsive hot-wire power indicators which are mechanically coupled in opposition to actuate an indicator as a function of the difference of the powers applied to each hot-wire mechanism. Any of the well known coupling networks may be employed to couple the thermionic diode peak or average detectors to the transmission line to provide the desired inductive and capacitive coupling thereto.

The use of thermionic diode linear peak or average detectors for the measurement of radio frequency power is advantageous for the reasons that overloading of such detectors within wide limits ordinarily causes no damage thereto, since they inherently are limiting devices dependent upon electronic emission from the diode cathode electrode. Since the diode detectors have such a limiting action, damage to the oppositely coupled electromagnetic wattmeter elements is substantially prevented. Also, it is well known that the linear characteristics of diode peak or average detectors are much more accurate and reliable than the approximately square law characteristics of the thermocouples, modulators or triode vacuum tube voltmeter circuits employed heretofore.

It must be pointed out however, that the instant circuit requires the use of special indicating devices comprising a pair of oppositely connected wattmeter elements. Also, as will be described in greater detail hereinafter, the instant invention provides theoretically accurate measurements of average radio frequency power only under conditions where power of a single frequency is being measured. However, useful measurements of frequency-modulated energy may be obtained by means of average voltage rectifiers. Also peak rectifiers provide useful peak power indications for amplitude modulated energy.

Among the objects of the invention are to provide an improved method of and means for measuring alternating current power applied to a transmission line. Another object of the invention is to provide an improved radio frequency wattmeter providing accurate measurements of power at a single frequency on a radio frequency transmission line. An additional object of the invention is to provide an improved radio frequency wattmeter employing a pair of linear peak or average detectors and a pair of differentially-connected wattmeter elements to indicate single frequency radio frequency power on said line.

Other objects of the invention include an improved radio frequency power measuring circuit providing accurate measurements of single frequency power on a transmission line over a relatively wide frequency range. Another object is to provide an improved radio frequency wattmeter which is substantially immune to reasonable power or current overloads. A further object is to provide an improved radio frequency wattmeter employing a pair of thermionic diode linear peak detectors in combination with a pair of current-square responsive elements for indicating radio frequency power applied to a transmission line.

The invention will be described in greater detail by reference to the accompanying drawing of which Figure 1 is a schematic circuit diagram of one embodiment thereof, Figure 2 is a schematic circuit diagram of a modification of the embodiment of the invention illustrated in Figure 1, and Figure 3 is a schematic circuit diagram of a second embodiment of the invention. Similar reference characters are applied to similar elements throughout the drawing.

Referring to Figure 1, an unbalanced transmission line comprising an ungrounded conductor 1 and a grounded conductor 3 is connected to supply radio frequency power from a source, not shown, to a load 5. A first capacitor 7, serially connected with a first resistor 9 coupled between the line conductors 1, 3 provides a first voltage divider 11. Similarly, a second capacitor 13, serially connected with a second resistor 15 coupled between the line conductors 1, 3 provides a second voltage divider 17. A first coupling loop 19, inductively coupled to the ungrounded line conductor 1, and having one end terminated on the first voltage divider at the junction of the first capacitor 7 and first resistor 9, provides a first means for inductively and capacitively coupling in phase to the ungrounded line conductor. Similarly, a second coupling loop 21, inductively coupled to the ungrounded line conductor 1, and having one end terminated at the junction of the second capacitor 13 and second resistor 15 of the second voltage divider 17, provides capacitive and inductive coupling in opposite phase to the ungrounded line conductor 1, since the mutual coupling between the line conductor 1 and the coupling loops are of opposite sign due to reversal of direction of the turns of the second coupling loop 21. The remaining terminal of the first coupling loop 19 is connected to the anode of a first conventional thermionic diode linear peak or average detector 23, the cathode of which is connected to the grounded line conductor 3 through a first coupling capacitor 25.

Similarly, the remaining terminal of the second coupling loop 21 is connected to the anode of a second thermionic diode linear peak or average detector 27, the cathode of which is connected to the grounded line conductor 3 through a second coupling capacitor 29.

The voltage $E_{R1}$ derived across the first coupling capacitor 25 is applied to the serially-connected, quadrature-disposed windings 31, 33 of a first conventional electromagnetic wattmeter element 35. Similarly, the voltage $E_{R2}$ across the second coupling capacitor 29 is applied to the serially-connected, quadrature-arranged windings 37, 39 of a second conventional electromagnetic wattmeter element 41. The two wattmeter elements 35, 41 are arranged to provide opposing deflections of a pointer 43 which is biased by means of a conventional pointer spring 45. Therefore, the deflections of the pointer 43 are proportional to the difference of the peak or average powers applied to the two oppositely actuated wattmeter elements 35, 41. If a conventional counter device is coupled to the wattmeter deflecting elements, and a retarding torque is applied thereto which is proportional to the velocity of rotation, an integrating wattmeter results, in a manner well known in the art.

In general, knowledge of the peak or average value of a waveform, comprising a line voltage $E$, a line current $I$ and a phase angle $\phi$, does not provide corresponding information concerning the R. M. S. value of the waveform. In the particular case of a waveform comprising a single frequency, however, knowledge of the peak or average voltage, current or power values does provide information concerning the corresponding R. M. S. values. Thus, if instead of the thermocouples employed in the prior art devices, two linear peak or average detectors are substituted, their output voltages will be proportional to the R. M. S. value of the applied voltages. Therefore, if the D.-C. output voltages of the linear peak or average detectors are squared by means of conventional wattmeter elements, and the difference between the square values is obtained by means of the opposing arrangement of two such wattmeters, the resultant wattmeter deflection will be proportional to the line power.

The detailed explanation herein considers only the case wherein rectified (D.-C.) currents are fed to the wattmeter elements. However, providing the time constants of the rectifiers are properly adjusted in accordance with known practice, the modulation component of an amplitude-modulated wave may be fed to the wattmeter deflection elements whereby the power indications will be proportional to the average power of the modulated wave.

In industrial heating applications, the integrating wattmeter, mentioned heretofore, may be employed to indicate the total energy or work applied, thereby providing an extremely useful indication. The accuracy of the wattmeter deflection, of course, will depend upon the phase shift resulting from the particular capacitive and inductive coupling between the transmission line and the pickup circuits.

The following mathematical explanation of a peak detection system, for example, further explains these relations. It may be assumed that the voltage applied to the two linear peak or average detectors is similar, within a constant, to the current supplied to the paired thermocouples of the prior art devices. Then the voltage $E_{R1}$ derived across the first coupling capacitor 25 is (1) $\quad E_{R1} = K_e(I \sin \omega t + K_c E \sin (\omega t + \phi))$ and the voltage $E_{R2}$ derived across the second coupling capacitor 29 is (2) $\quad E_{R2} = K_e(I \sin \omega t - K_c E \sin (\omega t + \phi))$ The peak value of these two voltages can be shown to be (3) $\quad$ peak of $E_{R1} = K_e \sqrt{I^2 + K_c^2 E^2 + 2K_c EI \cos \phi}$ and (4) $\quad$ peak of $E_{R2} = K_e \sqrt{I^2 + K_c^2 E^2 - 2K_c EI \cos \phi}$ from which it may be seen that the difference of the squares of expressions (3) and (4) is (5) $\quad 4L_e^2 K_c EI \cos \phi$ which is proportional to the power in the transmission line where $K_e$ and $K_c$ are constants, E is the line voltage, I is the line current and $\phi$ is the phase angle.

However, an analysis of the case where $n$ frequencies simultaneously are presented to linear peak detectors shows that (6) $\quad E_{R1} = K_e[(I_1 \sin \omega_1 t + I_2 \sin \omega_2 t + \ldots) + K_c(E_1 \sin (\omega_1 t + \phi_1) + E_2 \sin (\omega_2 t + \phi_2) + \ldots)]$ and (7) $\quad E_{R2} = K_e[(I_1 \sin \omega_1 t + I_2 \sin \omega_2 t + \ldots) - K_c(E_1 \sin (\omega_1 t + \phi_1) + E_2 \sin (\omega_2 t + \phi_2) + \ldots)]$ In general, the peak values of these voltages will be (8) $\quad$ Peak of $E_{R1} = K_e[\sqrt{I_1^2 + K_c^2 E_1^2 + 2K_c E_1 I_1 \cos \phi_1} + \sqrt{I_2^2 + K_c^2 E_2^2 + 2K_c E_2 I_2 \cos \phi_2} + \ldots]$ and (9) $\quad$ Peak of $E_{R2} = K_e[\sqrt{I_1^2 + K_c^2 E_1^2 - 2K_c E_1 I_1 \cos \phi_1} + \sqrt{I_2^2 + K_c^2 E_2^2 - 2K_c E_2 I_2 \cos \phi_2} + \ldots]$ There are special instances where the peak values will be less than indicated in Formulas 8 and 9 which need not be considered. Squaring the voltages indicated in Formulas 8 and 9 and deriving their difference, it is seen that the resultant voltage is equal to:

(10) $\quad K_e^2[4K_c E_1 I_1 \cos \phi_1 + 4K_c E_2 I_2 \cos \phi_2 + \ldots +$
$2\sqrt{(I_1^2 + K_c^2 E_1^2 + 2K_c E_1 I_1 \cos \phi_1)(I_2^2 + K_c^2 E_2^2 + 2K_c E_2 I_2 \cos \phi_2)} -$
$2\sqrt{(I_1^2 + K_c^2 E_1^2 - 2K_c E_1 I_1 \cos \phi_1)(I_2^2 + K_c^2 E_2^2 - 2K_c E_2 I_2 \cos \phi_2)} + \ldots]$ Thus, the resultant torque on the special four-coil wattmeter mechanism will be proportional to the expression (10). In order that this torque may be proportional to the power in the transmission circuit, the radical terms in expression (10) must add to zero but since the radicals do not have equal magnitudes, it can be shown that each radical must go to zero. This condition can only obtain if all the currents and voltages, except one set, are zero, in which case evaluating the above expressions with $I_2$ and $E_2$ equal to zero, we obtain

(11) $\quad 4K_e^2 K_c E^1 I^1 \cos \phi^1$

Thus, it follows that wattmeter circuits of the type described herein employing linear peak detectors in general provide correct power indications only when currents of a single frequency are applied thereto.

The circuit of Figure 2 operates on substantially the same principles as the circuit described in detail heretofore by reference to Figure 1, with the exception that the improved line coupling circuit, disclosed and claimed in the copending application mentioned heretofore, is employed to reduce power indication errors due to phase shift in the coupling circuit.

Briefly, currents proportional to the transmission line voltage are derived from the voltage divider 47 comprising a pair of serially-connected capacitors 49, 51 connected between the center point of a series line inductor 53 in the ungrounded transmission line conductor 1 and the grounded line conductor 3. Oppositely-phased inductive currents proportional to load current are derived from secondary inductors 55, 57 having opposite mutual coupling to the series line conductor 53 and being electrostatically shielded therefrom by means of a shield indicated by the dash line 59 which is grounded. The first diode linear peak or average detector is connected across the first secondary winding 55, and its cathode is grounded through the first coupling capacitor 25. The second diode linear peak or average detector 27 is connected across the second secondary winding 57, and its cathode is grounded through the second coupling capacitor 29. The anodes of the two diodes 23, 27 are connected together and connected through a phase compensating network 61 to the common terminals of the voltage dividing capacitors 49, 51.

The oppositely-actuated electromagnetic wattmeter elements 35, 41 are connected, as illustrated in Figure 1, to respond to the voltages across the coupling capacitors 25, 29 respectively, to provide deflection of the wattmeter pointer 43 as a function of the difference of the powers applied to the two wattmeter elements. The phase shift in the phase correcting network 61 provides satisfactory compensation for phase shift in the line coupling circuits over a relatively wide frequency range.

Figure 3 illustrates a circuit for employing diode linear peak or average detectors and duplex hot-wire, current-square meter elements for indicating power on a transmission line to which is coupled the unity coupling device described in the patent mentioned heretofore. As explained in greater detail in said patent, the ungrounded line conductor 1 is surrounded for a predetermined portion of its length by means of a cylindrical conductive element 63 which provides both capacitive and oppositely-phased inductive currents. These currents are detected by the diode linear peak or average detectors 23, 27 to provide corresponding voltages across the coupling capacitors 25, 29 in the same general manner as described heretofore in connection with the circuit of Figure 1. The variable capacitor 65, connected between the ungrounded line conductor 1 and the coupling cylinder 63 provides a convenient means for adjusting the sensitivity of the wattmeter circuit. The voltages across the coupling capacitors 25 and 29 are applied to separate high resistance, current-square, hot-wire indicating instruments 67, 69 which are mechanically coupled in opposition, as indicated by the dash line 71, to provide deflection of a meter needle 43 proportional to the difference of the squares of the currents applied to the two meter elements. The operation is somewhat analogous to the operation of the prior art thermocouple circuits with the exception that the diode peak detectors 23, 27 provide convenient limiting action to prevent damage to the hot-wire instrument elements.

Thus the invention described comprises an improved radio frequency wattmeter which may be coupled in any known manner to measure the radio frequency power in all conventional types of transmission lines, whether balanced or unbalanced, open or coaxial, as well as waveguides. The invention utilizes conventional line coupling networks combined with a pair of linear peak or average detectors which actuate a pair of differentially connected wattmeter elements to provide meter indications proportional to line power.

I claim as my invention:

1. A radio frequency wattmeter for a power transmission line including first reactive coupling means for deriving substantially in-phase currents from said line, second reactive means for deriving substantially oppositely-phased currents from said line, a pair of linear detectors each responsive to a different one of said derived currents, separate power responsive means each comprising quadrature disposed electromagnetic current multiplying means each responsive to one of said detectors, and means coupling said power responsive means in opposition for indicating the difference of the power derived from said detectors.

2. A radio frequency wattmeter for a power transmission line including first inductive and capacitive coupling means for deriving substantially in-phase currents from said line, second inductive and capacitive means for deriving substantially oppositely-phased currents from said line, a pair of linear average voltage detectors each responsive to a different one of said derived currents, separate power responsive means each comprising quadrature disposed electromagnetic current multiplying means each responsive to one of said detectors, and means coupling said power responsive means in opposition for indicating the difference of the power derived from said detectors.

3. A radio frequency wattmeter for a power transmission line including first reactive coupling means for deriving substantially in-phase currents from said line, second reactive means for deriving substantially oppositely-phased currents from said line, a pair of thermionic diode linear detectors each responsive to a different one of said derived currents, separate power responsive means each comprising quadrature disposed electromagnetic current multiplying means each responsive to one of said detectors, and means coupling said power responsive means in opposition for indicating the difference of the power derived from said detectors.

4. A radio frequency wattmeter for a power transmission line including first reactive coupling means for deriving substantially in-phase currents from said line, second reactive means for deriving substantially oppositely-phased currents from said line, a pair of indirectly heated thermionic diode linear detectors each responsive to a different one of said derived currents, separate power responsive means each comprising quadrature disposed electromagnetic current multiplying means each responsive to one of said detectors, and means coupling said power responsive means in opposition for indicating the difference of the power derived from said detectors.

5. A radio frequency wattmeter for a power transmission line including first inductive coupling means for deriving first currents substantially in-phase with currents in said line, second inductive means for deriving second currents substantially oppositely-phased with respect to currents in said line, resistive-capacitive means for deriving third currents of magnitude proportional to the voltage on said line, a pair of linear detectors each responsive to said third current and to a different one of said derived first and second currents, separate power responsive means each comprising quadrature disposed electromagnetic current multiplying means each responsive to one of said detectors, and means coupling said power responsive means in opposition for indicating the difference of the power derived from said detectors.

6. In a radio frequency wattmeter for a power transmission line including first reactive coupling means for deriving substantially in-phase currents from said line, second reactive means for deriving substantially oppositely-phased currents from said line, and a pair of linear detectors each responsive to a different one of said derived currents, the improvement comprising separate power responsive means each comprising quadrature disposed electromagnetic current multiplying means each responsive to one of said detectors, and means coupling said power responsive means in opposition for indicating the difference of the power derived from said detectors.

7. In a radio frequency wattmeter for a power transmission line including first inductive and capacitive coupling means for deriving substantially in-phase currents from said line, and second inductive and capacitive means for deriving substantially oppositely-phased currents from said line, the improvement comprising a pair of linear detectors each responsive to a different one of said derived currents, separate power responsive means each comprising quadrature disposed electromagnetic current multiplying means each responsive to one of said detectors, and means coupling said power responsive means in opposition for indicating the difference of the power derived from said detectors.

8. A radio frequency wattmeter for a power transmission line including first reactive coupling means for deriving substantially in-phase currents from said line, second reactive means for deriving substantially oppositely-phased currents from said line, a pair of detectors each responsive to a different one of said derived currents, separate power responsive means each comprising quadrature disposed electromagnetic current multiplying means each responsive to one of said detectors, and means coupling said power responsive means in opposition for indicating the difference of the power derived from said detectors.

9. A radio frequency wattmeter for a power transmission line including first reactive coupling means for deriving substantially in-phase currents from said line, second reactive means for deriving substantially oppositely-phased currents from said line, a pair of linear peak detectors each responsive to a different one of said derived currents, separate power responsive means each comprising quadrature disposed electromagnetic current multiplying means each responsive to one of said detectors, and means coupling said power responsive means in opposition for indicating the difference of the power derived from said detectors.

10. A radio frequency wattmeter for a power transmission line including first inductive and capacitive coupling means for deriving substantially in-phase currents from said line, second inductive and capacitive means for deriving substantially oppositely-phased currents from said line, a pair of linear detectors each responsive to a different one of said derived currents, separate power responsive means each comprising quadrature disposed electromagnetic current multiplying means each responsive to one of said detectors, and means coupling said power responsive means in opposition for indicating the difference of the power derived from said detectors.

DAVID R. CROSBY.

REFERENCES CITED

The following references are of record in the file of this patent:

UNITED STATES PATENTS

| Number | Name | Date |
| --- | --- | --- |
| 2,335,486 | Clark | Nov. 30, 1943 |
| 2,344,641 | Rosencrans | Mar. 21, 1944 |
| 2,385,044 | Vassar | Sept. 18, 1945 |

FOREIGN PATENTS

| Number | Country | Date |
| --- | --- | --- |
| 834,436 | France | Aug. 16, 1938 |